(12) United States Patent
Omote et al.

(10) Patent No.: US 10,854,348 B2
(45) Date of Patent: Dec. 1, 2020

(54) X-RAY GENERATOR AND X-RAY ANALYSIS DEVICE

(71) Applicant: Rigaku Corporation, Tokyo (JP)

(72) Inventors: Kazuhiko Omote, Tokyo (JP); Takeshi Osakabe, Tokyo (JP); Tetsuya Ozawa, Tokyo (JP); Licai Jiang, Rochester Hills, MI (US); Boris Verman, Bloomfield, MI (US)

(73) Assignee: RIGAKU CORPORATION, Tokyo (JP)

( * ) Notice: Subject to any disclaimer, the term of this patent is extended or adjusted under 35 U.S.C. 154(b) by 0 days.

(21) Appl. No.: 16/284,777

(22) Filed: Feb. 25, 2019

(65) Prior Publication Data
US 2019/0272929 A1    Sep. 5, 2019

(30) Foreign Application Priority Data

Mar. 1, 2018    (JP) .................................. 2018-036208

(51) Int. Cl.
*G21K 1/00*    (2006.01)
*G21K 1/06*    (2006.01)
(Continued)

(52) U.S. Cl.
CPC ............ *G21K 1/067* (2013.01); *G01N 23/201* (2013.01); *G21K 1/025* (2013.01); *H05G 1/02* (2013.01);
(Continued)

(58) Field of Classification Search
CPC ........ G21K 1/067; G21K 1/025; G21K 1/062; G21K 2201/061; G21K 1/06; G21K 1/00;
(Continued)

(56) References Cited

U.S. PATENT DOCUMENTS

| 6,014,423 A | * | 1/2000 | Gutman | ................. | B82Y 10/00 |
| | | | | | 378/156 |
| 6,041,099 A | * | 3/2000 | Gutman | ................. | B82Y 10/00 |
| | | | | | 378/84 |

(Continued)

FOREIGN PATENT DOCUMENTS

| EP | 3 168 856 B1 | 3/2019 |
| EP | 3 152 554 B1 | 7/2019 |

(Continued)

OTHER PUBLICATIONS

European Search Report and Opinion of EP 19 15 9575.0, dated Aug. 5, 2019.

(Continued)

*Primary Examiner* — Kiho Kim
(74) *Attorney, Agent, or Firm* — Cantor Colburn LLP (57) ABSTRACT

An X-ray generator includes: a line X-ray source; a multi-layer film mirror; and a side-by-side reflecting mirror including two concave mirrors joined together so as to share a join line. A cross section of a reflecting surface of the multilayer film mirror has a parabolic shape, and a focus of the parabolic shape is located at the line X-ray source. Cross sections of reflecting surfaces of the two concave mirrors of the side-by-side reflecting mirror each have a parabolic shape, and each of focuses of the parabolic shapes is located on a side opposite to the multilayer film mirror. An extended line of the join line of the side-by-side reflecting mirror passes through the multilayer film mirror and the line X-ray source as viewed in a plan view.

5 Claims, 5 Drawing Sheets (51) Int. Cl.
*G01N 23/201* (2018.01)
*G21K 1/02* (2006.01)
*H05G 1/02* (2006.01)

(52) U.S. Cl.
CPC ....... *G01N 2223/308* (2013.01); *G21K 1/062* (2013.01); *G21K 2201/061* (2013.01)

(58) Field of Classification Search
CPC .... H05G 1/02; G01N 23/201; G01N 223/308; G01N 23/00
See application file for complete search history.

(56) References Cited

U.S. PATENT DOCUMENTS

| | | | |
|---|---|---|---|
| 8,249,220 B2 | 8/2012 | Verman et al. |
| 9,390,881 B2 | 7/2016 | Yun et al. |
| 9,448,190 B2 | 9/2016 | Yun et al. |
| 9,449,781 B2 | 9/2016 | Yun et al. |
| 9,543,109 B2 | 1/2017 | Yun et al. |
| 9,570,265 B1 | 2/2017 | Yun et al. |
| 9,594,036 B2 | 3/2017 | Yun et al. |
| 9,823,203 B2 | 11/2017 | Yun et al. |
| 10,269,528 B2 | 4/2019 | Yun et al. |
| 10,295,485 B2 | 5/2019 | Yun et al. |
| 10,297,359 B2 | 5/2019 | Yun et al. |
| 2008/0084967 A1 | 4/2008 | Matsuo et al. |
| 2011/0085644 A1 | 4/2011 | Verman et al. |
| 2013/0329858 A1 | 12/2013 | Jiang |
| 2013/0329861 A1 | 12/2013 | Jiang et al. |
| 2017/0336334 A1 | 11/2017 | Yun et al. |

FOREIGN PATENT DOCUMENTS

| | | |
|---|---|---|
| JP | 2008-96180 | 4/2008 |
| JP | 2015-520384 | 7/2015 |
| JP | 2015-522809 | 8/2015 |

OTHER PUBLICATIONS

Platonov, Yuriy, et al., "Beam conditioning multilayer optics for laboratory X-ray sources", Visual Communications and Image Processing; Jan. 20, 2004; San Jose, vol. 9590, Aug. 26, 2015 (Aug. 26, 2015), pp. 95900B-95900B, XP060060690, DOI: 10.1117/12. 2196352; ISBN: 978-1-62841-730-2.

* cited by examiner

X-RAY GENERATOR AND X-RAY ANALYSIS DEVICE

CROSS-REFERENCE TO RELATED APPLICATION

The present application claims priority from Japanese application JP 2018-036208, filed on Mar. 1, 2018, the content of which is hereby incorporated by reference into this application.

BACKGROUND OF THE INVENTION

1. Field of the Invention

The present invention relates to an X-ray generator and an X-ray analysis device, and particularly to a technique for providing a focused X-ray beam.

2. Description of the Related Art

An X-ray generator capable of radiating a focused X-ray beam having a small beam size onto a desired position (e.g., a position where a sample is disposed) has been used. JP2015-520384A discloses a dual mode scattering system or a dual mode diffraction system. As disclosed in FIG. 3A in JP2015-520384A, a radiation source 214 is a line source of radiation, and an X-ray beam from the radiation source 214 passes through a second opening of an aperture 236 and interacts with both a first surface 222 and a second surface 224 of a KB optical system, thereby forming, for example, a two-dimensional beam 232 serving as a point beam. FIG. 1 in JP2015-522809A discloses a dual mode small-angle X-ray scattering system in a two-dimensional operating mode.

JP2008-096180A discloses an X-ray optical system in which a polycapillary 36 is used to obtain a point-like X-ray beam. In the X-ray optical system, a third state in which a focused beam whose cross section is focused into a point shape is obtained is realized.

SUMMARY OF THE INVENTION

Conventionally, a line X-ray source has been widely used in an X-ray diffraction measurement in view of the balance between a resolution and a sample size.

The dual mode scattering system or the dual mode diffraction system disclosed in JP2015-520384A and JP2015-522809A includes the line X-ray source (the radiation source 214) widely used because of the reason described above. However, for forming a focused X-ray beam (a two-dimensional beam), the X-ray beam from the radiation source 214 is limitedly selected (narrowed) by the second opening, which is, for example, a square hole; therefore, a high-intensity focused X-ray beam is not realized even when the X-ray beam that has passed through the second opening is focused.

In the X-ray optical system disclosed in JP 2008-96180 A, the polycapillary 36 is used to realize a focused X-ray beam; therefore, the divergence angle of the X-ray beam is large, leading to a reduction in resolution in X-ray diffraction measurement.

The invention has been made in view of the problems, and it is an object of the invention to provide an X-ray generator and an X-ray analysis device that are capable of realizing with a simple configuration a focused X-ray beam whose beam size is small and whose divergence angle is small.

(1) For solving the problems, an X-ray generator according to an aspect of the invention includes: a line X-ray source; a multilayer film mirror; and a side-by-side reflecting mirror including two concave mirrors joined together so as to share a join line, wherein a cross section of a reflecting surface of the multilayer film mirror has a parabolic shape and a focus of the parabolic shape is located at the line X-ray source, and cross sections of reflecting surfaces of the two concave mirrors of the side-by-side reflecting mirror each have a parabolic shape and each of focuses of the parabolic shapes is located on a side opposite to the multilayer film mirror.

(2) The X-ray generator according to (1), wherein an extended line of the join line of the side-by-side reflecting mirror may pass through the multilayer film mirror and the line X-ray source as viewed in a plan view.

(3) The X-ray generator according to (1) or (2), wherein mutual relative positions of the line X-ray source, the multilayer film mirror, and the side-by-side reflecting mirror may be fixed, and the X-ray generator may further include a moving mechanism that translates the line X-ray source, the multilayer film mirror, and the side-by-side reflecting mirror as one integrated body in a direction intersecting with an optical axis direction of an X-ray beam.

(4) An X-ray analysis device according to an aspect of the invention may include: the X-ray generator according to any of (1) to (3); and a support stage that supports a sample disposed so as to include focuses of the respective two concave mirrors of the side-by-side reflecting mirror.

(5) An X-ray analysis device according to an aspect of the invention may include: the X-ray generator according to any of (1) to (3); a detector disposed such that focal positions of the two concave mirrors of the side-by-side reflecting mirror are located on the detector; and a support stage that supports a sample disposed between the side-by-side reflecting mirror and the detector so as to be radiated with an X-ray emitted by the side-by-side reflecting mirror.

The invention provides an X-ray generator and an X-ray analysis device that are capable of realizing with a simple configuration a focused X-ray beam whose beam size is small.

DETAILED DESCRIPTION OF THE INVENTION

Hereinafter, an embodiment of the invention will be described with reference to the drawings. In the drawings, dimensions, shapes, and the like may be schematically represented, compared to those in practicing aspects of the invention, for more clarity of description. However, they are illustrative only and do not limit the interpretation of the invention. In the specification and the drawings, elements similar to those described in relation to a previous drawing are denoted by the same reference numerals and signs, and a detailed description may be appropriately omitted.

Figure 1:
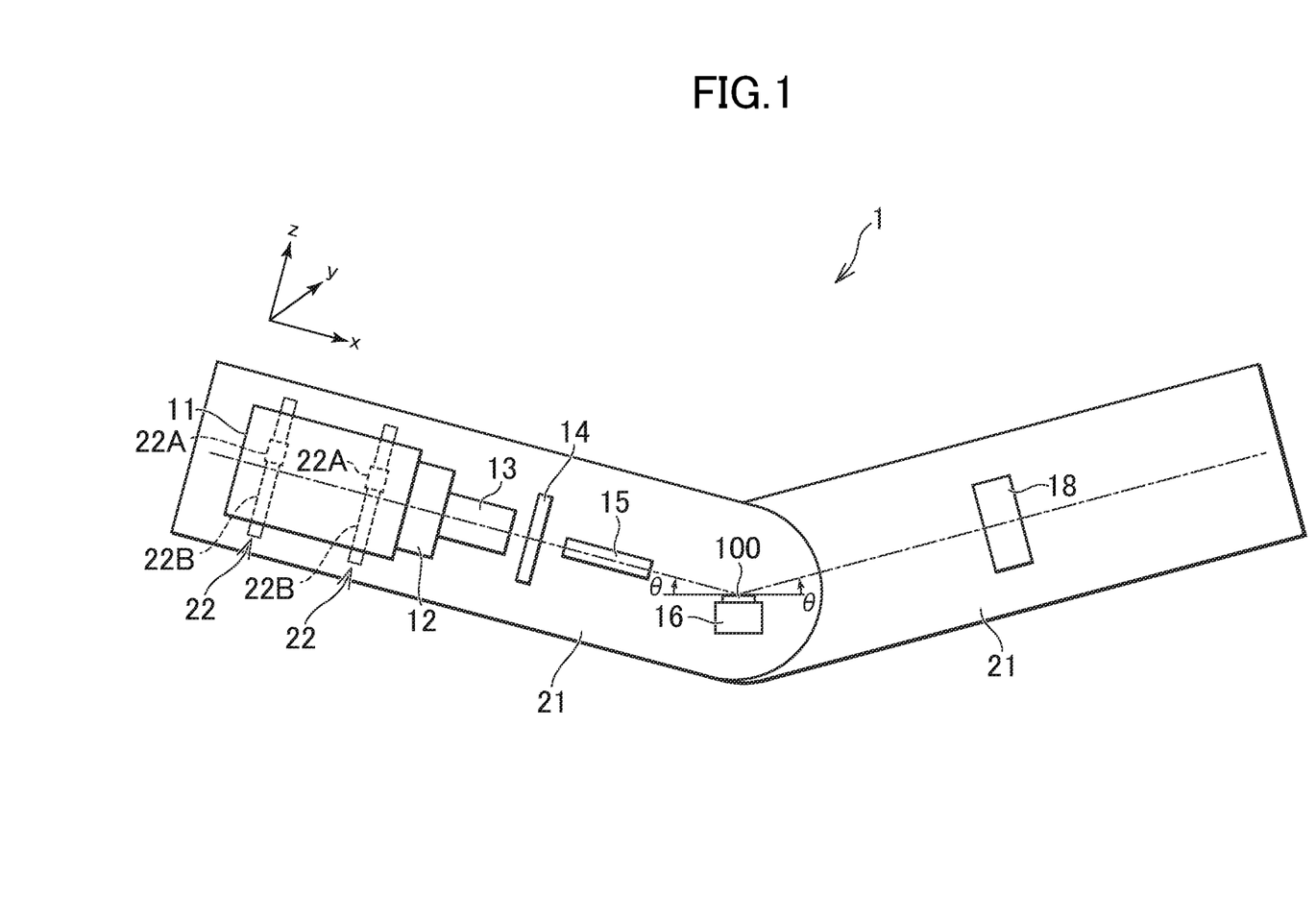
FIG. 1 is a schematic view showing the configuration of an X-ray analysis device according to an embodiment of the invention.

FIG. 1 is a schematic view showing the configuration of an X-ray analysis device 1 according to the embodiment of the invention. Here, the X-ray analysis device 1 according to the embodiment is an X-ray diffractometer device (XRD) but is not limited to this. The X-ray analysis device 1 may be a small-angle X-ray scattering device (SAXS) or may be other X-ray analysis devices. The X-ray analysis device 1 according to the embodiment includes an X-ray source portion 11, a CBO unit 12, a focusing element 13, an aperture 14, a collimator 15, a support stage 16 to support a sample 100, a two-dimensional detector 18, a goniometer 21, and a moving mechanism 22. An X-ray generator 2 (not shown) according to the embodiment includes the X-ray source portion 11, the CBO unit 12, the focusing element 13, the aperture 14, the collimator 15, and the moving mechanism 22. In the specification, the X-ray generator includes not only the X-ray source portion emitting an X-ray but also an X-ray optical system portion that forms an X-ray beam to be radiated onto a sample. Here, the X-ray optical system portion includes the CBO unit 12, the focusing element 13, the aperture 14, and the collimator 15. However, the collimator 15 is not essential but may be used as necessary.

The goniometer 21 is a θ-θ goniometer of a horizontally disposed sample type. The goniometer 21 can perform 2θ scan while horizontally holding the sample 100 supported on the support stage 16. By horizontally placing the sample 100, the influence of bend of the sample 100 due to its weight can be minimized, and the risk of falling of the sample 100 can be suppressed. The goniometer 21 includes two arms extending from the sample 100 supported by the support stage 16 at the center. A typical direction of an X-ray beam that propagates from the focusing element 13 to the sample 100 is defined as an x-axis direction, and a plane that is perpendicular to the x-axis direction is defined as a yz plane. The X-ray source portion 11, the CBO unit 12, the focusing element 13, the aperture 14, the collimator 15, and the moving mechanism 22 are mounted on one of the arms along the x-axis direction. The two-dimensional detector 18 is mounted on the other arm. The two arms rotate by θ in opposite directions with each other with respect to the sample 100, and thus the two-dimensional detector 18 can be rotated by 2θ when the sample 100 rotates by θ with respect to an X-ray beam that is incident on the sample 100.

The X-ray source portion 11 includes a rotor target. By radiating an electron beam whose cross section is linear onto the rotor target, X-rays are generated by a rotor target surface. Through a slit window disposed in parallel with an axis of rotation of the rotor target, an X-ray that transmits through the slit window, in the X-rays generated by the rotor target, is emitted to the outside. The X-ray source portion 11 can be deemed to include a line X-ray source 11A. It is sufficient that the X-ray source portion 11 includes one that includes (can be deemed to include) a line X-ray source, without limiting to a rotor target, and the X-ray source portion 11 may include, for example, a sealed tube.

The CBO (cross beam optics) unit 12 includes a slit plate 31 (not shown) including two slits 31A and 31B (not shown) on an incident side, and further includes a multilayer film mirror 12A (not shown). One (31A) of the two slits 31A and 31B is for a direct beam, and the other (31B) is for a collimated beam that is monochromatically collimated by the multilayer film mirror 12A. By moving the two slits 31A and 31B in a direction (y-direction) perpendicular to an optical axis (a propagation direction of the X-ray beam: a z-axis) of the X-ray beam, a user selects whether to use the slit 31A for the direct beam or the slit 31B for the collimated beam. In the embodiment, the slit 31B for the collimated beam is selected. Herein, the X-ray generator 2 (the X-ray optical system portion) includes the CBO unit 12 but is not limited to this. It is sufficient that the X-ray generator 2 (the X-ray optical system portion) includes an optical component including the multilayer film mirror 12A.

Across section of a reflecting surface of the multilayer film mirror 12A has a parabolic shape. The multilayer film mirror 12A is disposed such that the focus of the parabolic shape is located at the line X-ray source 11A. The multilayer film mirror 12A has a multilayer structure in which a characteristic X-ray (herein Cu Kα X-ray) serving as a target is selectively reflected. In X-rays emitted from the line X-ray source 11A, an X-ray beam that reaches the reflecting surface of the multilayer film mirror 12A is reflected at the reflecting surface of the multilayer film mirror 12A and monochromatically collimated.

The focusing element 13 includes a side-by-side reflecting mirror 13A (not shown) including two concave mirrors joined together. Herein, for focusing the collimated X-ray beam, each of cross sections of the two concave mirrors has a parabolic shape, and the collimated X-ray beam incident on the side-by-side reflecting mirror 13A is focused on a confocal point of the side-by-side reflecting mirror 13A located on the side opposite to the multilayer film mirror 12A.

The X-ray source portion 11, the CBO unit 12, and the focusing element 13 are fixed to one another and integrated. The CBO unit 12 is fixed to the X-ray source portion 11, and the focusing element 13 is fixed to the CBO unit 12. The integrated these components are mounted on the moving mechanism 22. The moving mechanism 22 includes, for example, connecting portions 22A to be joined to the X-ray source portion 11, and a step motor controls the movement of the connecting portion 22A on a rail 22B. In the embodiment, the moving mechanism 22 includes two connecting portions 22A and two rails 22B respectively moving the two connecting portions 22A. Details will be described later.

The collimator 15 absorbs a scattering X-ray beam and transmits a straight traveling X-ray beam. The collimator 15 selectively transmits a desired focused X-ray beam of X-ray beams emitted from the focusing element 13. It is sufficient that the collimator 15 is disposed as necessary, and the collimator 15 may not be necessarily disposed.

The two-dimensional detector 18 is a detector capable of two-dimensionally detecting an X-ray generated from the sample 100, but is not limited to this. The two-dimensional detector 18 may be a one-dimensional detector or a scintillation detector as necessary. Moreover, an RxRy attachment for sample tilt alignment to be performed before in-plane measurement or reciprocal space map measurement may be mounted on the support stage 16 supporting the sample 100.

Figure 2:
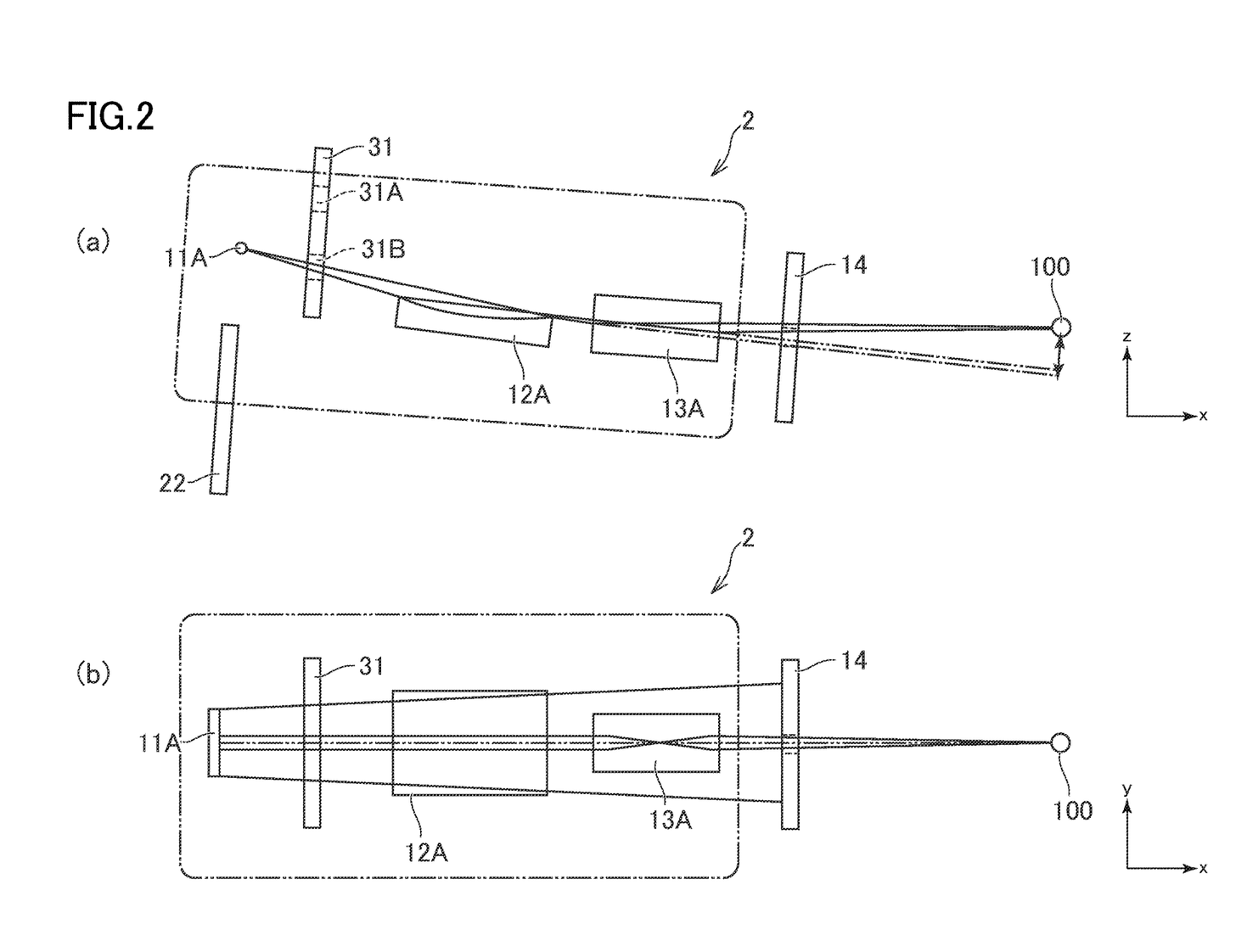
FIG. 2 is a schematic views showing the configuration of an X-ray generator according to the embodiment of the invention.

FIG. 2 is a schematic views showing the configuration of the X-ray generator 2 according to the embodiment. As shown in FIG. 2, only main components are shown for clarity of the state of an X-ray beam. FIG. 2 (*a*) is a side view of the X-ray generator 2. FIG. 2(*b*) is a plan view of the X-ray generator 2. In FIG. 2, the line X-ray source 11A of the X-ray source portion 11, the slit plate 31 and the multilayer film mirror 12A of the CBO unit 12, the sideby-side reflecting mirror 13A of the focusing element 13, and the aperture 14 are shown. As shown in FIG. 2, the side view of the X-ray generator 2 shows an xz plane, and the plan view of the X-ray generator 2 shows the xy plane.

Figure 3:
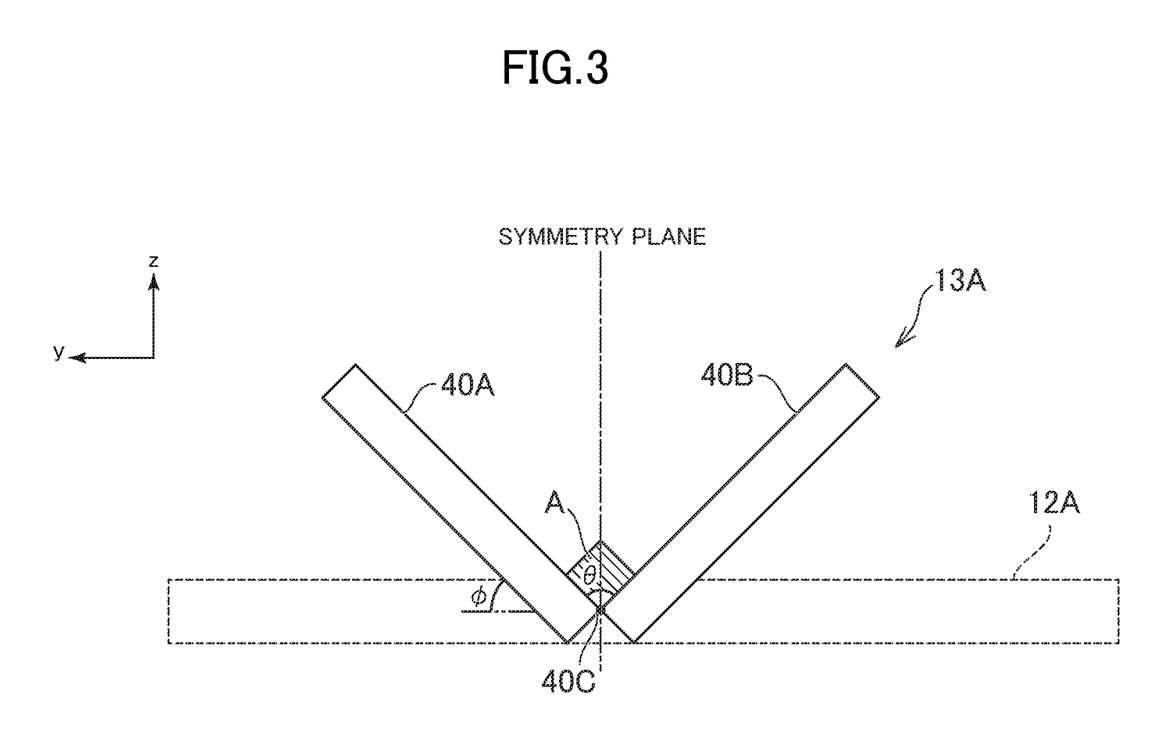
FIG. 3 is a cross-sectional view of a side-by-side reflecting mirror according to the embodiment of the invention.

FIG. 3 is a cross-sectional view of the side-by-side reflecting mirror 13A according to the embodiment, showing the yz plane. As shown in FIG. 3, the side-by-side reflecting mirror 13A includes two concave reflecting mirrors 40A and 40B. Here, it is desirable that cross sections of reflecting surfaces of the two concave reflecting mirrors 40A and 40B each have a parabolic shape, and it is further desirable that the two concave reflecting mirrors 40A and 40B are substantially equivalent to each other. In the side-by-side reflecting mirror 13A, the two concave reflecting mirrors 40A and 40B are joined in contact with each other so as to share a join line 40C. The two concave reflecting mirrors 40A and 40B each have the reflecting surface serving as a concave, and the reflecting surface can be closely akin to a plane. The two concave reflecting mirrors 40A and 40B are joined such that the reflecting surfaces of the two concave reflecting mirrors 40A and 40B intersect with each other, and it is desirable that the two concave reflecting mirrors 40A and 40B are joined so as to be substantially at a right angle. Here, the phrase "substantially at a right angle" means that an angle $\theta$ formed by the reflecting surface of the concave reflecting mirror 40A and the reflecting surface of the concave reflecting mirror 40B via the join line 40C is 85° or more and 95° or less, and it is further desirable that the angle $\theta$ is 88° or more and 92° or less. It is needless to say that the angle $\theta$ is still desirably 90°.

In a cross section (a cross section perpendicular to the x-axis direction) of the side-by-side reflecting mirror 13A, one (the concave reflecting mirror 40A) is disposed on the counterclockwise side and the other (the concave reflecting mirror 40B) is disposed on the clockwise side, with respect to the z-axis direction. It is desirable that the concave reflecting mirror 40A and the concave reflecting mirror 40B are disposed such that a cross section of the concave reflecting mirror 40A and a cross section of the concave reflecting mirror 40B are nearly plane symmetrical with a plane including the z-axis and the join line 40C being as a symmetry plane. Ideally, it is desirable that the cross sections are plane symmetrical, but it is sufficient that the cross sections are substantially plane symmetrical. It is desirable that an angle $\phi$ formed by the reflecting surface of the concave reflecting mirror 40A and the y-axis direction is substantially 45°. Here, the phrase "substantially 45°" means that the angle $\phi$ is 40° or more and 50° or less, and it is further desirable that the angle $\phi$ is 43° or more and 47° or less. It is needless to say that the angle is still desirably 45°.

It is desirable that both the focus of the parabolic shape that is the cross section of the reflecting surface of the concave reflecting mirror 40A and the focus of the parabolic shape that is the cross section of the reflecting surface of the concave reflecting mirror 40B are included in the sample 100. It is further desirable that these two focuses are as close as possible to each other, and ideally, it is desirable that these two focuses coincide with each other. However, it is sufficient that these two focuses are close to each other to such an extent as to substantially coincide with each other. The focus of the parabolic shape that is the cross section of the reflecting surface of the concave reflecting mirror 40A and the focus of the parabolic shape that is the cross section of the reflecting surface of the concave reflecting mirror 40B substantially coincide with each other, and the side-by-side reflecting mirror 13A according to the embodiment is a confocal reflecting mirror.

In collimated X-ray beams that reach the side-by-side reflecting mirror 13A, an X-ray beam that passes through an area A shown in FIG. 3 is focused. The area A has substantially a square shape, and the length (diagonal) in the y-axis direction is approximately 1 mm. Moreover, for comparison, a cross-sectional shape of the multilayer film mirror 12A is represented by an imaginary line, and the length of the multilayer film mirror 12A in the y-axis direction is approximately 8 mm.

As shown in FIG. 2(*b*), the side-by-side reflecting mirror 13A is disposed such that an extended line of the join line 40C of the side-by-side reflecting mirror 13A passes through the center lines of the multilayer film mirror 12A and the line X-ray source 11A as viewed in a plan view. Ideally, it is desirable that the extended line of the join line 40C of the side-by-side reflecting mirror 13A coincides with the center line of the multilayer film mirror 12A and the center line of the line X-ray source 11A as viewed in a plan view; however, the invention is not limited to this, and it is sufficient that the extended line of the join line 40C substantially coincides with the center lines. It is sufficient that the extended line of the join line 40C of the side-by-side reflecting mirror 13A at least passes through the multilayer film mirror 12A and the line X-ray source 11A as viewed in a plan view.

In X-rays emitted by the line X-ray source 11A, an X-ray beam that reaches the reflecting surface of the multilayer film mirror 12A is reflected by the reflecting surface and collimated. The collimated X-ray beam is focused by the side-by-side reflecting mirror 13A. By disposing the sample 100 at the focus of the X-ray beam, a small X-ray beam can be radiated onto the sample 100, which can realize measurement for a small sample or mapping of small portion of a sample.

The X-ray generator according to the embodiment can realize with a simple configuration a focused X-ray beam having a high intensity and a small beam size (focus size) by use of the line X-ray source, the multilayer film mirror, and the side-by-side reflecting mirror. Here, the small beam size is 200 µm or less. With use of the line X-ray source, a point-focused beam can be easily obtained by disposing the side-by-side reflecting mirror 13A in measurement using a high integrated intensity.

As shown in FIG. 2(*b*), a propagation direction of an X-ray is the x-axis direction as viewed in a plan view (in an xy plane), and it is easy to adjust an optical axis. However, an X-ray beam is reflected at the multilayer film mirror 12A and the side-by-side reflecting mirror 13A, and a shift in the focal position of the focused X-ray beam occurs with respect to the z-axis direction. The present inventors have studied that, for example, a shift of approximately 7 mm occurs in the embodiment. In the X-ray generator 2 according to the embodiment, the X-ray source portion 11, the CBO unit 12, and the focusing element 13 are fixed to one another and integrated as described above. That is, mutual relative positions of the line X-ray source 11A, the multilayer film mirror 12A, and the side-by-side reflecting mirror 13A are fixed. It is desirable that the mutual relative positions of the X-ray source portion 11, the CBO unit 12, and the focusing element 13 are brought into a still preferred state by carrying out an optical axis adjustment and thereafter that the X-ray source portion 11, the CBO unit 12, and the focusing element 13 are fixed to one another. The moving mechanism 22 can translate the line X-ray source 11A, the multilayer film mirror 12A, and the side-by-side reflecting mirror 13A as one integrated body along an extending direction of the rail 22B by moving with the step motor the connecting portion 22A on the rail 22B. Here, the extending direction of the rail 22B is along the z-axis direction. It is desirable that the extending direction (a translation direction of the moving mechanism 22) of the rail 22B coincides with the z-axis direction; however, the extending direction does not necessarily need to coincide therewith, and it is sufficient that the extending direction is a direction that intersects with the propagation direction of the X-ray beam. It is ideal that an angle formed by the extending direction and the propagation direction of the X-ray beam is 90°; however, it is sufficient that the angle is 85° or more. It is further desirable that the angle is 88° or more.

Figure 4A:
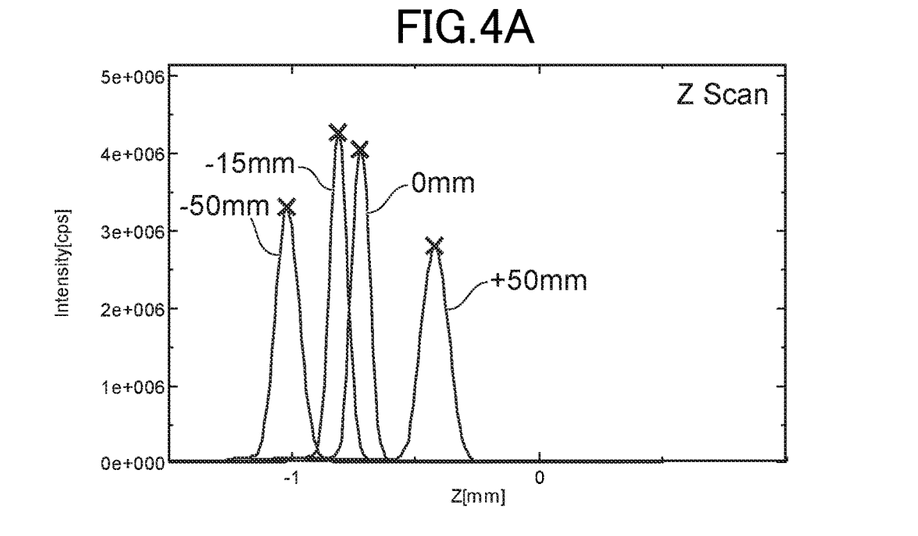
FIG. 4A shows a beam size of a focused X-ray of the X-ray generator according to the embodiment of the invention.
Figure 4B:
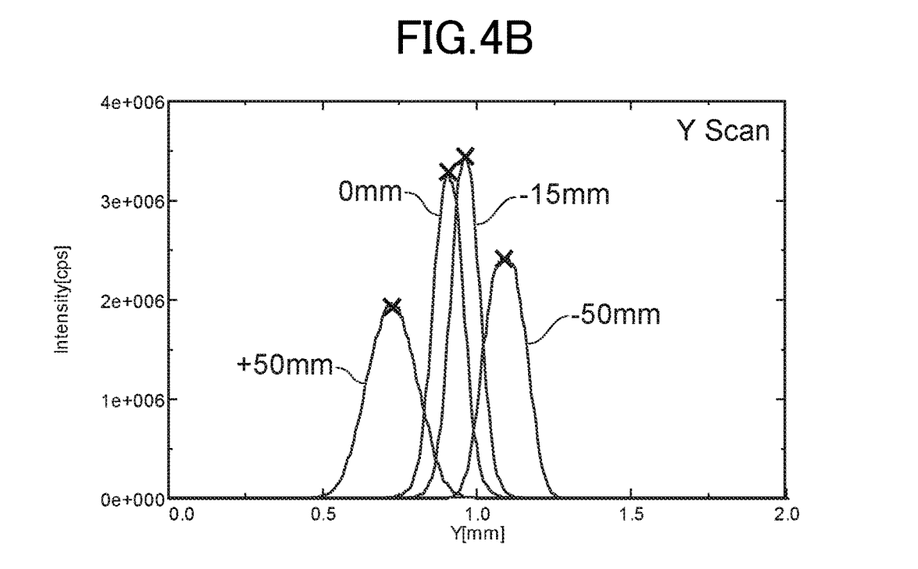
FIG. 4B shows a beam size of a focused X-ray of the X-ray generator according to the embodiment of the invention.
Figure 4C:
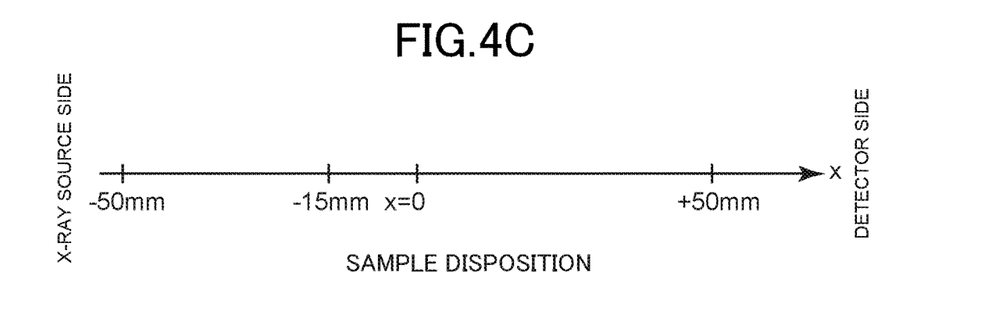
FIG. 4C shows a position where a slit is disposed in an x-axis direction.

FIGS. 4A and 4B show a beam size of a focused X-ray of the X-ray generator 2 according to the embodiment. FIG. 4A shows a result of z-axis-direction scanning of a slit disposed at a position where a sample is disposed or in the vicinity of the position. FIG. 4B shows a result of y-axis-direction scanning of the slit disposed at the position where the sample is disposed or in the vicinity of the position. FIG. 4C shows the position where the slit is disposed in the x-axis direction. The scanning is performed in a state where the angle θ of the goniometer 21 is 0°, that is, in a state where the X-ray source portion 11, the support stage 16, and the two-dimensional detector 18 are disposed substantially in a straight line, and the two-dimensional detector 18 detects an X-ray intensity of the focused X-ray.

FIG. 4A shows by four curves the intensity of the focused X-ray scanning in the z-axis direction, when the position in the x-axis direction is at −50 mm, −15 mm, 0 mm, and +50 mm as shown in FIG. 4C, at the origin position in the y-axis direction. FIG. 4B shows by four curves the intensity of the focused X-ray scanning in the y-axis direction, when the position in the x-axis direction is at −50 mm, −15 mm, 0 mm, and +50 mm as shown in FIG. 4C, at the origin position in the z-axis direction.

As shown in FIG. 4A, in the case of z-axis-direction scanning of the slit, an X-ray beam whose peak intensity is low and whose peak width is wide when the position in the x-axis direction is at +50 mm and -50 mm is high in peak intensity and is narrowed in peak width when the position in the x-axis direction is the position (0 mm) where the sample is disposed. Further, at the position of −15 mm, the peak intensity is further high and the peak width is further narrowed, so that an X-ray beam whose focus size is small can be realized and that an X-ray optical axis adjustment can be realized.

As shown in FIG. 4B, in the case of y-axis-direction scanning of the slit, an X-ray beam whose peak intensity is low and whose peak width is wide when the position in the x-axis direction is at +50 mm and −50 mm is high in peak intensity and is narrowed in peak width when the position in the x-axis direction is the position (0 mm) where the sample is disposed. Further, at the position of −15 mm, the peak intensity is further high and the peak width is further narrowed, so that an X-ray beam whose focus size is small can be realized and that an X-ray optical axis adjustment can be realized.

Figure 5:
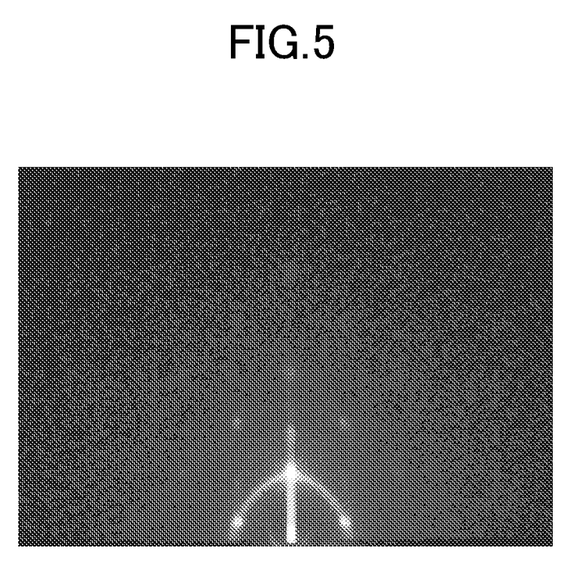
FIG. 5 shows an experimental result of the X-ray analysis device according to the embodiment of the invention.

FIG. 5 shows an experimental result of the X-ray analysis device 1 according to the embodiment. A two-dimensional scattering image obtained by grazing-incidence small-angle X-ray scattering (GI-SAXS) measurement, in which an X-ray is incident at a grazing angle on the surface of the sample 100 and the X-ray reflected and scattered is measured by the two-dimensional detector, is shown. A focused X-ray beam whose focus size is small is realized by the X-ray generator 2, and thus spot-like reflection is confirmed in the two-dimensional scattering image shown in FIG. 5. Moreover, since the spread of lattice points in an arc direction is confirmed, it is considered that a random component is contained.

The X-ray generator and the X-ray analysis device according to the embodiment of the invention have been described above. In the embodiment, the sample is disposed at the focal position of the focused X-ray beam; however, the invention is not limited to this. For example, the X-ray analysis device includes the X-ray generator, the detector, and the support stage supporting the sample, in which the focuses of the two concave mirrors of the side-by-side reflecting mirror each may include any point between the sample and the detector. In the case of the configuration, the focal positions of the two concave mirrors of the side-by-side reflecting mirror each may be located between the sample and the detector.

What is claimed is:

1. An X-ray generator comprising:
    a line X-ray source for emitting an X-ray beam in a first direction, the line X-ray source being elongated in a second direction perpendicular to the first direction, the X-ray beam being elongated in the second direction;
    a multilayer film mirror for reflecting and collimating the X-ray beam; and
    a side-by-side reflecting mirror for reflecting and focusing the X-ray beam collimated by the multilayer film mirror, the side-by-side reflecting mirror including two concave mirrors joined together so as to share a join line, wherein:
    a cross section of a reflecting surface of the multilayer film mirror has a parabolic shape and a focus of the parabolic shape is located at the line X-ray source, the reflecting surface is configured to keep the X-ray beam elongated in the second direction; and
    cross sections of reflecting surfaces of the two concave mirrors of the side-by-side reflecting mirror each have a parabolic shape and each of focuses of the parabolic shapes is located on a side opposite to the multilayer film mirror, the reflecting surfaces are configured to make the elongated X-ray beam point-focused.

2. The X-ray generator according to claim 1, wherein an extended line of the join line of the side-by-side reflecting mirror passes through the multilayer film mirror and the line X-ray source as viewed in a plan view.

3. The X-ray generator according to claim 1, wherein:
    mutual relative positions of the line X-ray source, the multilayer film mirror, and the side-by-side reflecting mirror are fixed; and
    the X-ray generator further includes a moving mechanism that translates the line X-ray source, the multilayer film mirror, and the side-by-side reflecting mirror as one integrated body in a direction intersecting with an optical axis direction of an X-ray beam.

4. An X-ray analysis device comprising:
    the X-ray generator according to claim 1; and
    a support stage that supports a sample disposed so as to include focuses of the respective two concave mirrors of the side-by-side reflecting mirror.

5. An X-ray analysis device comprising:
    the X-ray generator according to claim 1;
    a detector disposed such that focal positions of the two concave mirrors of the side-by-side reflecting mirror are located on the detector; and a support stage that supports a sample disposed between the side-by-side reflecting mirror and the detector so as to be radiated with an X-ray emitted by the side-by-side reflecting mirror.

\* \* \* \* \*